United States Patent
Petton et al.

(10) Patent No.: US 10,619,294 B2
(45) Date of Patent: *Apr. 14, 2020

(54) AQUEOUS INKJET PRINTING LIQUIDS

(71) Applicant: AGFA NV, Mortsel (BE)

(72) Inventors: Lionel Petton, Mortsel (BE); Johan Loccufier, Mortsel (BE); Ellen Bertels, Mortsel (BE)

(73) Assignee: AGFA NV, Mortsel (BE)

( * ) Notice: Subject to any disclaimer, the term of this patent is extended or adjusted under 35 U.S.C. 154(b) by 19 days.

This patent is subject to a terminal disclaimer.

(21) Appl. No.: 15/749,166

(22) PCT Filed: Jul. 28, 2016

(86) PCT No.: PCT/EP2016/068048
§ 371 (c)(1),
(2) Date: Jan. 31, 2018

(87) PCT Pub. No.: WO2017/021278
PCT Pub. Date: Feb. 9, 2017

(65) Prior Publication Data
US 2018/0216289 A1 Aug. 2, 2018

(30) Foreign Application Priority Data
Aug. 3, 2015 (EP) .................... 15179461

(51) Int. Cl.
| | | |
|---|---|---|
| *C09D 11/00* | (2014.01) | |
| *D06P 1/54* | (2006.01) | |
| *D06P 5/20* | (2006.01) | |
| *D06P 5/30* | (2006.01) | |
| *D06P 1/52* | (2006.01) | |
| *C09D 11/106* | (2014.01) | |
| *C09D 11/322* | (2014.01) | |
| *C09D 11/40* | (2014.01) | |
| *D06P 1/00* | (2006.01) | |
| *C09D 11/38* | (2014.01) | |

(52) U.S. Cl.
CPC .............. *D06P 1/54* (2013.01); *C09D 11/106* (2013.01); *C09D 11/322* (2013.01); *C09D 11/38* (2013.01); *C09D 11/40* (2013.01); *D06P 1/0016* (2013.01); *D06P 1/5214* (2013.01); *D06P 1/5221* (2013.01); *D06P 1/5228* (2013.01); *D06P 1/5257* (2013.01); *D06P 5/2083* (2013.01); *D06P 5/30* (2013.01)

(58) Field of Classification Search
CPC ..... C09D 11/196; C09D 11/322; C09D 11/38; C09D 11/40; D06P 1/54; D06P 1/0016; D06P 1/5214; D06P 5/30
USPC ......................................................... 523/160
See application file for complete search history.

(56) References Cited

U.S. PATENT DOCUMENTS

| | | |
|---|---|---|
| 5,853,861 A | 12/1998 | Held |
| 2003/0199614 A1 | 10/2003 | Wang et al. |
| 2007/0157849 A1 | 7/2007 | Kluge et al. |
| 2009/0226678 A1 | 9/2009 | Yatake et al. |
| 2009/0226682 A1 | 9/2009 | Yatake |
| 2009/0281240 A1* | 11/2009 | Li .................... C09D 11/30 524/590 |
| 2011/0245399 A1* | 10/2011 | Pajerski ............ C08F 283/008 524/457 |
| 2012/0176663 A1* | 7/2012 | Zang ................... C09K 19/544 359/296 |
| 2012/0306976 A1 | 12/2012 | Kitagawa et al. |
| 2013/0065031 A1* | 3/2013 | Kasperchik ........ C09D 11/322 428/207 |
| 2017/0029637 A1* | 2/2017 | Loccufier ........... C09D 11/102 |
| 2018/0230647 A1* | 8/2018 | Petton .................... D06P 5/30 |

FOREIGN PATENT DOCUMENTS

| | | |
|---|---|---|
| EP | 2 441 807 A1 | 4/2012 |
| EP | 2 647 674 A1 | 10/2013 |
| WO | 03/029362 A2 | 4/2003 |
| WO | 2005/083017 A1 | 9/2005 |
| WO | 2009/137753 A1 | 11/2009 |
| WO | 2012/035827 A1 | 3/2012 |

OTHER PUBLICATIONS

Official Communication issued in International Patent Application No. PCT/EP2016/068048, dated Sep. 8, 2016.

* cited by examiner

*Primary Examiner* — Hannah J Pak
(74) *Attorney, Agent, or Firm* — Keating and Bennett, LLP

(57) ABSTRACT

An inkjet printing liquid contains thermally reactive composite resin particles in an aqueous medium, wherein the thermally reactive composite resin particles contain: a) at least one thermal cross-linker; and b) at least one polymeric resin containing functional groups suitable for reacting with the thermal cross-linker.

7 Claims, 2 Drawing Sheets

AQUEOUS INKJET PRINTING LIQUIDS

CROSS REFERENCE TO RELATED APPLICATIONS

This application is a 371 National Stage Application of PCT/EP2016/068048, filed Jul. 28, 2016. This application claims the benefit of European Application No. 15179461.7, filed Aug. 3, 2015, which is incorporated by reference herein in its entirety.

BACKGROUND OF THE INVENTION

1. Field of the Invention

The present invention relates to aqueous inkjet printing liquids for industrial printing applications, such as textile printing, leather printing and the like.

2. Description of the Related Art

In textile printing, there is an increasing tendency towards shorter printing runs as an answer to the market evolution of fast changing designs and personalisation. Analogue printing technologies, such as screen printing, are becoming less attractive as production technology due to laborious prepress operations such as screen preparations, while digital printing techniques are gaining interest as they allow direct printing from a digital file without prepress operations.

Initial ink developments for ink jet printing on textile were focussed on dye based inks. Dye based inks have several disadvantages. The type of dye has to be selected in function of the type of fibre of the fabric. In order to obtain good wash fastness and colourfastness, the required pre- and post treatments, such as steaming and washing, result in a complex workflow with considerable environmental impact.

For fibre independency and reduced environmental impact, the focus in recent ink developments has shifted towards pigment based inks in combination with fixation chemistry to adhere the pigments to the fibres. Several approaches for fibre fixation of pigments have been disclosed in the prior art, involving both non-reactive and reactive resin based inks.

WO 03/029362 (COATES BROTHERS) discloses an ink composition comprising at least one pigment, at least one dispersed resin selected from the group consisting of acrylic acrylonitrile resins, styrene-acrylic resins, acrylic-butadiene resins, butadiene acrylonitrile resins and polyurethane resins, at least one cross-linker and a liquid medium. Melamine resins are disclosed particularly preferred resins.

WO 2005/083017 (BASF) discloses an ink for textile printing comprising specific wetting agents for spreading control. The ink includes a pigment and a polyurethane dispersing agent in combination with a melamine as fixing agent.

WO 2009/137753 (DUPONT) discloses an ink comprising a colorant, a specific cross-linked polyurethane designed for hydrolytical stability and a post curing agent selected from the group consisting of amide and amine formaldehyde resins, phenolic resins, urea resins and blocked isocyanates, with melamine formaldehyde resins as preferred embodiment.

WO 03/029362 (COATES BROTHERS), WO 2005/083017 (BASF) and WO 2009/137753 (DUPONT) all use dissolved melamine resins as cross-linker. Jetting reliability, an essential requirement in an industrial environment, has proven to be poor due to unwanted cross-linking of the dissolved melamine resins at the inkjet printhead nozzle upon evaporation.

U.S. Pat. No. 5,853,861 (DUPONT) discloses an ink textile combination, where the ink comprises a pigment and a polymer having a functional group selected from an acid, a base, an epoxy and a hydroxyl group and where the textile comprises a functional group selected from the group consisting of a hydroxyl, an amine, an amide and a carbonyl moiety and a cross-linker selected from specific organometallic compounds and isocyanates. This approach requires a pre-treatment of the textile with a specific cross-linker, which is less preferred as approach since it makes the printing process more complex.

US 2009226678 (SEIKO EPSON) discloses an ink set including a pigmented ink and a fixing liquid which is a combination of two colloidal systems: specific polymer particles with a $T_g$ below $-10°$ C. as fixing agent and a blocked isocyanate dispersion as cross-linker. Reliable printing performance is highly dependent on carefully balancing the colloidal stabilisation mechanism of the two colloidal systems having a negative influence on the shelf-life of the fixing liquid. US 2009226682 (SEIKO EPSON) discloses an ink for textile printing wherein a pigment is added as a third colloidal system, making the ink stability even more critical for industrial applications requiring long term stability and reliable printing. Furthermore, it is common knowledge that high concentrations of low $T_g$ polymers hold the risk of spontaneous film formation at the nozzle upon evaporation, leading to jetting reliability problems.

US 2012306976 (MATSUI SHIKISO CHEMICAL CO.) discloses an ink comprising a pigment, an acrylate based resin as pigment dispersing agent, a water soluble fixing agent, and a blocked isocyanate as cross-linker. The water soluble fixing agent is a water soluble polymer such as a poly(vinyl alcohol) derivative or a polyurethane based resin. The cross-linker is capable of cross-linking the dispersant and the polymer fixing agent upon thermal treatment at a temperature of at least 100° C. Water soluble polymers have a negative impact on the jetting performance by impacting the drop formation or causing latency problems when used in high concentrations. Due to the increase in ink viscosity, only a limited concentration of these water soluble polymers can be used as fixing agent, achieving only mediocre wash and crock fastness is achieved.

EP2647674A provide a binder for an ink-jet printing ink. The binder for ink-jet printing ink of the present invention includes a vinyl polymer dispersed in an aqueous medium by a urethane resin having a hydrophilic group. The urethane resin and the vinyl polymer are not present in a state in which they independently form resin particles. The vinyl polymer comprises vinyl monomers having a cross-linkable functional group.

WO2012/035827A discloses a binder for an inkjet printing ink, in which composite resin particles, formed by reacting a polyurethane with an epoxy compound, are dispersed in an aqueous medium.

EP2441807A disclose a binder for an inkjet printing ink, the binder including a polysiloxane, a hydrophilic-group-containing polyurethane, and an aqueous medium, wherein the polysiloxane and the hydrophilic group-containing polyurethane form composite resin particles and the polysiloxane is dispersed in the aqueous medium with the hydrophilic group-containing polyurethane. The polysiloxanes and the hydrophilic group polyurethane in the composite resin particles are not chemically bonded to each other.

US2003/199614A discloses an ink jet ink composition comprising composite colorant polymer particles, wherein the composite colorant polymer particles have a pigment phase and a polymer phase. The polymer phase of the particles are formed in situ, wherein a portion of an addition polymerization initiator is added to an aqueous colorant mixture before adding a monomer mixture to the colorant mixture in a continuous process.

Several industrial applications require a high pigment load in the ink to meet the required production speeds at an acceptable manufacturing cost level. Therefore, ink jet inks with a high solid content have to be designed, making it particularly challenging to guarantee the jetting reliability required for industrial applications, especially when high pigment loads have to be combined with reactive fixing chemistry. By enhancing the solid content of reactive resin based inks, latency, spontaneous film formation and unwanted cross-linking at the nozzle upon evaporation of water become more critical.

None of the disclosed approaches fulfils all requirements for high speed inkjet printing in an industrial environment such as textile printing. Therefore, there is still a need for thermally reactive inks allowing a high solid pigment content, while maintaining a high printing reliability for industrial applications and exhibiting improved wash fastness, colour fastness and crock fastness.

SUMMARY OF THE INVENTION

In order to overcome the problems described above, preferred embodiments of the present invention provide an inkjet printing liquid as described below.

It was found that very high printing reliability was obtained by combining a thermal cross-linker and a polymeric resin into a thermally reactive composite resin particle. An especially stable dispersion of thermally reactive composite resin particles was obtained by using an amphiphilic polymeric resin. Colour images printed using inkjet printing liquids containing these thermally reactive composite resin particles exhibited excellent wash fastness, colour fastness and crock fastness.

Further objects of the invention will become apparent from the description hereinafter.

DETAILED DESCRIPTION OF THE PREFERRED EMBODIMENTS

Definitions

Figure 1:
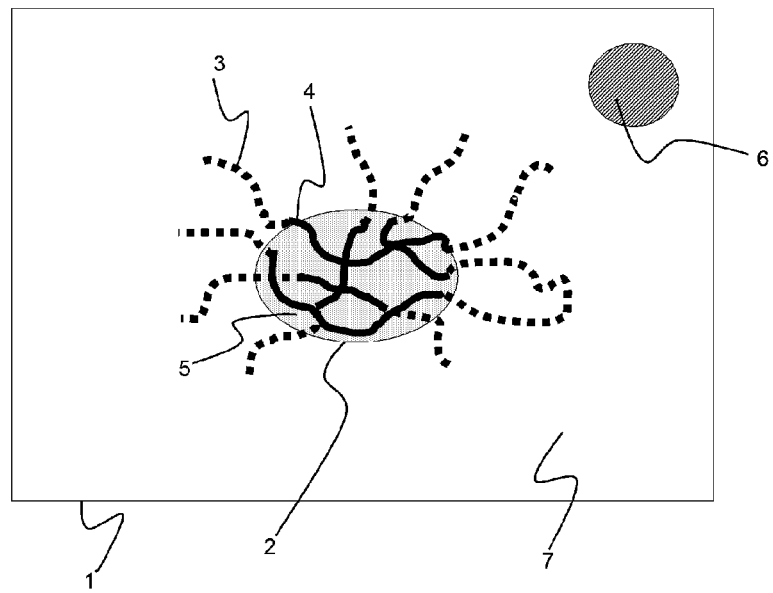
FIG. 1 is a schematic representation of a preferred embodiment of an inkjet printing liquid (1) according to the invention containing a colorant (6) and a thermally reactive composite resin particle (2) in an aqueous medium (7), wherein the thermally reactive composite resin particle (2) is composed of thermal cross-linker (5) and an amphiphilic polymer having hydrophilic polymeric segments (3) and hydrophobic polymeric segments (4).
Figure 2:
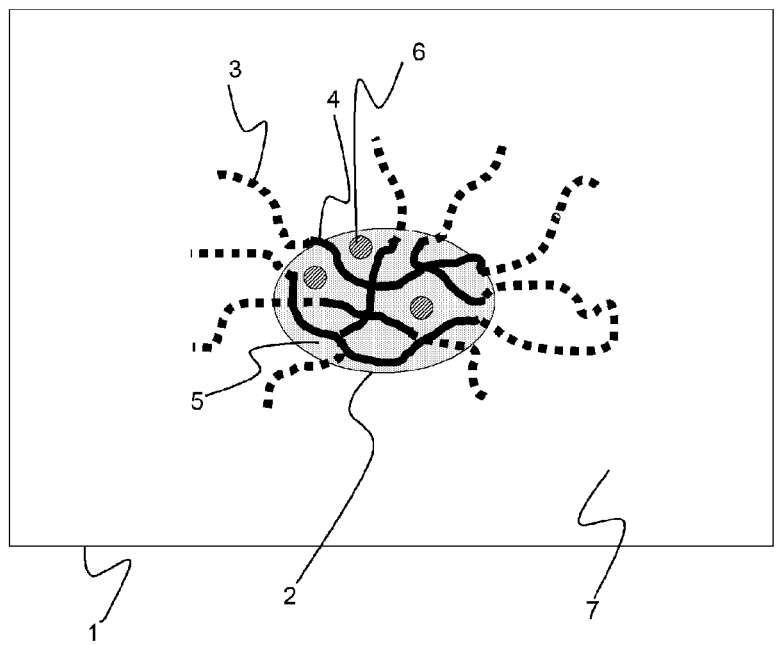
FIG. 2 is a schematic representation of a preferred embodiment of a similar printing liquid (1) as in FIG. 1 except that the colorant (6) is now located inside the composite resin particle (2). An inkjet printing liquid (1) according to FIG. 1 or FIG. 2 wherein the colorant was omitted is a colourless inkjet printing liquid, sometimes also referred to as a fixing liquid.

The term "image" means any form of decorative pattern or any form of representing information, such as pictures, logos, drawings, photographs, barcodes and text.

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_1$ to $C_6$-alkenyl group.

Unless otherwise specified a substituted or unsubstituted alkynyl group is preferably a $C_1$ to $C_6$-alkynyl group.

Unless otherwise specified a substituted or unsubstituted aralkyl group is preferably a phenyl or naphthyl group including one, two, three or more $C_1$ to $C_6$-alkyl groups.

Unless otherwise specified a substituted or unsubstituted alkaryl group is preferably a $C_7$ to $C_{20}$-alkyl group including a phenyl group or naphthyl group.

Unless otherwise specified a substituted or unsubstituted aryl group is preferably a phenyl group or naphthyl group Unless otherwise specified a substituted or unsubstituted heteroaryl group is preferably a five- or six-membered ring substituted by one, two or three oxygen atoms, nitrogen atoms, sulphur atoms, selenium atoms or combinations thereof.

Unless otherwise specified an optionally substituted alkylene group, an optionally substituted arylene group, an optionally substituted alkarylene group and an optionally substituted aralkylene group preferably contain 1 to 20 carbon atoms and may be substituted by one, two or three oxygen atoms, nitrogen atoms, sulphur atoms, selenium atoms or combinations thereof.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more constituents selected from the group consisting of methyl, ethyl, n-propyl, isopropyl, n-butyl, isobutyl and tertiary-butyl, ester, amide, ether, thioether, ketone, aldehyde, sulfoxide, sulfone, sulfonate ester, sulphonamide, —Cl, —Br, —I, —OH, —SH, —CN and —$NO_2$.

Thermally Reactive Composite Resin Particles

A composite particle is a solid mixture made of several different substances. The thermally reactive composite resin particles used in a inkjet printing liquid according to the present invention incorporate into a solid particle at least one thermal cross-linker and at least one polymeric resin containing functional groups suitable for reacting with the thermal cross-linker.

Composite resin particles should not be confused with capsules. Capsules are composed of a polymeric shell surrounding a core. The advantage of using thermally reactive composite resin particles instead of capsules is that no polymeric shell has to be made permeable or to be broken e.g. by applying pressure. The manufacturing process of composite resin particles is also much simpler than capsules.

Composite resin particles should also not be confused with micelles, as exemplified by US 2014002556 (SEIKO EPSON) for encapsulating a liquid mixture of UV curable monomers. The use of micelles in an inkjet printing liquid introduces high amounts of surfactants in the ink, which later often cause problems of adhesion and ink spreading. Instead of a high content of surfactant, the stabilization of an aqueous dispersion of composite resin particles can easily be obtained by using an amphiphilic polymer in the thermally reactive composite resin particle or by using a small amount of polymeric dispersant adhering to the surface of the thermally reactive composite resin particles.

Inkjet Printing Liquids

An inkjet printing liquid is a liquid that is jettable by an inkjet print head, such as a piezoelectric print head or a valve jet print head. If the inkjet printing liquid contains a colorant, it is also referred to as an inkjet ink.

The inkjet printing liquid according to the present invention contains thermally reactive composite resin particles in an aqueous medium, wherein the thermally reactive composite resin particles contain:
a) at least one thermal cross-linker; and b) at least one polymeric resin containing functional groups suitable for reacting with the thermal cross-linker.

The inkjet printing liquid may be colourless or coloured. If the inkjet printing liquid is colourless, it is preferably used in combination with one or more colour pigmented inkjet inks, more preferably one or more aqueous colour pigmented inkjet inks.

A colourless inkjet printing liquid can be used for security purposes. For example, it contains a compound which becomes only visible upon exposure to UV light. Such a security feature can advantageously be used for anti-counterfeiting purposes for packaging or in security documents like ID cards.

A colourless inkjet printing liquid can also be used to fix a pigmented ink on, for example, a textile. In one embodiment, an image can first be printed by one or more aqueous pigmented inkjet inks on a textile and then the colourless inkjet printing liquid is applied onto the inkjet printed image, followed by a heat treatment to fix the image.

Alternatively, the colourless inkjet printing liquid may be first applied onto a textile, after which an image is printed by one or more pigmented inkjet inks onto the optionally dried colourless inkjet printing liquid, and finally followed by a heat treatment to fix the image.

In still another embodiment, a "sandwich" can be made by applying a colourless inkjet printing liquid both before and after the jetting of one or more aqueous pigmented inkjet inks, followed by at least one heat treatment after the last application of colourless inkjet printing liquid.

In yet another particularly preferred embodiment, the colourless inkjet printing liquid is jetting simultaneously with the one or more aqueous pigmented inkjet inks, so that droplets of colourless inkjet printing liquid are "mixed" throughout the colour image made by the one or more aqueous pigmented inkjet inks. This "mixing" means that droplets of the colourless inkjet printing liquid may be laying under, between and on inkjet ink droplets.

However for reducing the cost of printing equipment, the inkjet printing liquid according to the invention is preferably coloured by including a colorant into the inkjet printing liquid. By using a coloured inkjet printing liquid according to the invention, there is no need for a colourless inkjet printing liquid to fix the colorant to e.g. a textile substrate as this is now realized by the coloured inkjet printing liquid itself. For inkjet printing, this results in a reduced number of print heads in the inkjet printing device.

In a preferred embodiment, the inkjet printing liquid is an inkjet ink containing a colour pigment in the aqueous medium or containing a colorant in at least some of the composite resin particles. Preferably a colour pigment is included in the aqueous medium, as inclusion in the composite resin particles tends to increase the average particle substantially which could have a negative effect on the printing reliability, e.g. by clogging of inkjet print head nozzles if the composite resin particles have a too large particle size.

In another preferred embodiment, the inkjet printing liquid is an inkjet ink containing a dye in at least some of the composite resin particles.

In yet another preferred embodiment, the inkjet printing liquid is an inkjet ink containing a dye in at least some of the composite resin particles and containing a colour pigment in the aqueous medium. This way the high brilliance attributed to dyes can be combined with the high light fading stability of pigments, resulting in a very large colour gamut.

The colourless inkjet printing liquid may be part of an inkjet ink set, preferably an inkjet ink set containing at least one colourless inkjet printing liquid according to the present invention and one or more aqueous pigmented inkjet inks. A preferred inkjet ink set contains at least one colourless inkjet printing liquid according to the present invention and at least CMYK or CRYK aqueous pigmented inkjet inks. The skilled person knows that C stands for cyan, M for magenta, R for red, Y for yellow and K for black.

A plurality of coloured inkjet printing liquids according to the present invention may also form an inkjet ink set. The inkjet ink set is preferably an ink set containing at least CMYK or CRYK inks, since colour management software for such ink sets is readily commercially available.

In other embodiments of the present invention, the inkjet ink set may be extended with specific colour inks such as red, green, blue, orange and/or violet inks.

In another preferred embodiment, an inkjet ink set includes at least a spot colour ink and a colourless inkjet printing liquid.

In another preferred embodiment, an inkjet ink set includes at least a spot colour ink and one or more coloured inkjet inks.

A spot colour ink is well-known to a person skilled in the arts of inks. For example, it is advantageously used when substantial surfaces have to be printed with a corporate colour such as Coca-Cola™ red or IBM™ blue. An advantage is, for instance, that it helps to reduce the amount of ink applied since otherwise the spot colour has to be produced by a combination of inks from the ink set.

The inkjet ink set may also include so-called light and dark inks of the same colour. In a preferred embodiment, the inkjet ink set includes a light and a dark magenta ink and/or a light and a dark cyan ink. The use of light and dark inks allows obtaining a better image quality. A dark ink is required for producing intense colours having a high saturation. If only a dark ink containing a high amount of colorant is available for producing pastel colours, then the graininess of the image increases drastically.

The inkjet ink set may also include black and grey inks. In addition to an increased graininess, the use of solely a black ink tends to produce grey colours having a brownish hue.

In a preferred embodiment, a black inkjet printing liquid according to the invention includes a colorant having an absorption peak between 500 and 700 nm, preferably a cyan colorant, more preferably a cyan dye or pigment and most preferably a cyan copper phthalocyanine pigment for reasons of high light stability. The addition of a colorant having a light absorption peak between 500 and 700 nm, especially a blue or cyan pigment, results in neutral black and grey colours.

The inkjet ink set may also include a white inkjet ink, preferably a white inkjet printing liquid including thermally reactive composite resin particles according to the invention. This allows obtaining more brilliant colours, especially on transparent substrates, where the white inkjet ink can be applied either as a primer or on top of the colour inkjet inks when the image is viewed through the transparent substrate.

A colourless inkjet printing liquid according to the invention may also be used for improving the gloss on certain substrates like textiles.

A person skilled in the art is very capable of adjusting the viscosity and the surface tension of the inkjet ink to fit the requirements of the application technique.

The viscosity of an inkjet ink according to the invention is preferably smaller than 25 mPa·s at 25° C. and at a shear rate of 90 s$^{-1}$, more preferably between 2 and 15 mPa·s at 25° C. and at a shear rate of 90 s$^{-1}$.

The surface tension of an inkjet ink according to the invention is preferably in the range of about 18 mN/m to about 70 mN/m at 25° C., more preferably in the range of about 20 mN/m to about 40 mN/m at 25° C. The inkjet ink may also contain at least one surfactant for obtaining good spreading characteristics on a substrate.

Manufacturing of Inkjet Printing Liquids

A method for manufacturing a inkjet printing liquid according to the invention includes the steps of: a) making a resin composition including
at least one thermal cross-linker; at least one polymeric resin containing functional groups suitable for reacting with the thermal cross-linker; and
a water immiscible solvent having a boiling point below 100° C. at normal pressure; b) mixing the resin composition with water; and c) forming thermally reactive composite resin particles in an aqueous medium by evaporating the water immiscible solvent. Esters, like ethyl acetate, are particularly preferred as water immiscible solvent.

A water immiscible solvent is an organic solvent having low miscibility in water. Low miscibility is defined as any water solvent combination forming a two phase system at 20° C. when mixed in a one over one volume ratio.

In a particularly preferred embodiment, the water immiscible solvent is ethyl acetate, because it has also a low flammability hazard compared to other organic solvents.

If a coloured inkjet printing liquid or inkjet ink is made by including a colour pigment stabilized by a polymeric dispersant, then the dispersion step of the colour pigment, such as milling in a pearl mill, is preferably performed in the absence of the composite resin particles. Instead of a colour pigment stabilized by a polymeric dispersant, a so-called self-dispersing colour pigment may be added directly to the thermally composite resin particles using some agitation, e.g. stirring, to disperse them uniformly in the inkjet printing liquid.

The polymeric dispersant added to the aqueous medium containing the composite resin particles preferably includes one more functional groups selected from a carboxylic acid or salt thereof, a sulfonic acid or salt thereof, a phosphoric acid ester or salt thereof, a phosphonic acid or salt thereof, an ammonium group, a sulfonium group, a phosphonium group and a polyethylene oxide group. In a more preferred embodiment, the polymeric dispersant added to the aqueous medium containing the composite resin particles preferably includes one more functional groups selected from the group consisting of: —COO-M$^+$, —SO$_3^-$M$^+$, —O—PO$_3^-$M$^+$, —O—SO$_3^-$M$^+$, —PO$_3^-$M$^+$; wherein M$^+$ represents H$^+$ or a cation selected from the group consisting of Na$^+$, Li$^+$, K$^+$ and NH$_4^+$.

The inkjet printing liquid preferably has a slightly alkaline aqueous medium, especially when using dispersants having carboxylic acid groups.

The inkjet printing liquid may be completed by addition of additives such as one or more humectants, surfactants, optothermal converting agents, antioxidants, light stabilizers, conductive particles and polymers, magnetic particles, or other compounds suitable for the specific application for which the inkjet printing liquid is to be used. Some of these additives may also be included into the composite resin particles. For example, for reasons of efficiency the light stabilizer may be included in the composite resin particles instead of the aqueous medium so that it is near a dye included in the composite resin particles and that it cannot be removed, for example, by washing the textile whereon the inkjet printing liquid is printed.

The thermally reactive composite resin particles are preferably present in an inkjet printing liquid in amount of 5 to 40 wt %, more preferably between 7 and 25 wt % based on the total weight of the inkjet printing liquid. It was observed that above 40 wt % jetting by an inkjet print head was not always so reliable, while below 5 wt % the fixation of the colorant became somewhat incomplete.

The thermally reactive composite resin particles preferably have an average particle size of no more than 5 μm as determined by dynamic laser diffraction. The nozzle diameter of inkjet print heads is usually 20 to 35 μm. Reliable inkjet printing is possible if the average particle size of the thermally reactive composite resin particles is about five times smaller than the nozzle diameter. An average particle size of no more than 5 μm allows jetting by print heads having the smallest nozzle diameter of 25 μm. In a more preferred embodiment, the average particle size of the composite resin particles is ten times smaller than the nozzle diameter. Hence preferably, the average particle size is from 0.05 to 2 μm, more preferably from 0.08 to 1 μm and most preferably between 100 and 400 nm. When the average particle size of the thermally reactive composite resin particles is smaller than 2 μm, excellent shelf-life is obtained.

Thermal Cross-Linkers

A thermal cross-linker is a compound that upon thermal treatment links one polymer chain to another. The bond between the polymers is called a cross-link.

The thermal cross-linker is preferably a compound functionalized with functional groups selected from the group consisting of an epoxide, an oxetane, an aziridine, an azetidine and a blocked isocyanate.

In a preferred embodiment, the thermal cross-linker is selected from the group consisting of an optionally etherified condensation product of formaldehyde and melamine, an optionally etherified condensation product of formaldehyde and ureum and a phenol formaldehyde resin, preferably a resole.

The thermal cross-linker may be a polymer, but is preferably a low molecular compound or an oligomer. The average molecular weight of the thermal cross-linker is preferably less than 2000. The thermal cross-linker is preferably not covalently bonded to the polymeric resin containing functional groups suitable for reacting with the thermal cross-linker when incorporated in the composite resin particle and when the composite resin particle is incorporated in the ink jet ink. This has the advantage that the cross-linker will show a greater diffusion length within the printed layer and hence show an improved fixation of the pigment to the substrate of fibre.

Blocked isocyanates are particularly preferred as thermal cross-linkers. The synthesis of blocked isocyanates is well-known to the skilled person and has been reviewed by Wicks D. A. and Wicks Z. W. Jr. (Progress in Organic Coatings, 36, 148-172 (1999)) and Delebecq et al. (Chem; Rev., 113, 80-118 (2013)).

Blocked isocyanates are defined as chemical components that are capable of forming isocyanates from a precursor upon thermal treatment. In general, the reaction can be summarized as given by the following scheme.

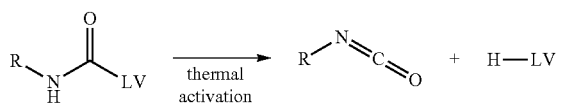

The activation temperature, also called deblocking temperature, is dependent on the leaving group and is selected dependent on the industrial application.

Preferred isocyanate precursors or blocked isocyanates having deblocking temperatures between 100° C. and 160° C. are given below by Table 1.

TABLE 1

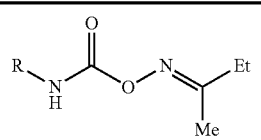 BI-1

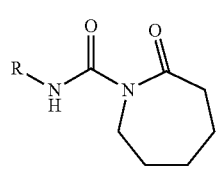 BI-2

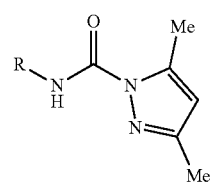 BI-3

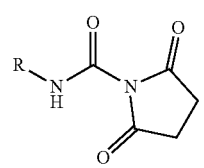 BI-4

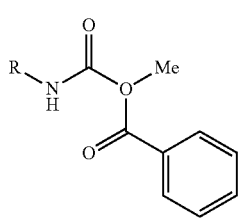 BI-5

TABLE 1-continued

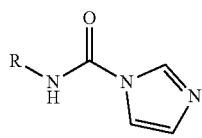 BI-6

In the above six isocyanate precursors, R represents the residue of a difunctional, multifunctional or polymeric blocked isocyanate. Difunctional and multifunctional blocked isocyanates are preferred. In a further preferred embodiment, R represents a hydrocarbon group, further functionalized with at least one and preferably two or more blocked isocyanates, where the blocked isocyanates can be the same as or different from the first blocked isocyanate listed above. The hydrocarbon group preferably comprises no more than 40 carbon atoms, more preferably no more than 30 carbon atoms and most preferably between 8 and 25 carbon atoms. The same blocked isocyanate functional groups as the first blocked isocyanate are preferred. In a further preferred embodiment R comprises aliphatic, cycloaliphatic or aromatic fragments or combinations thereof. Preferred aliphatic fragments are linear or branched saturated hydrocarbon chains comprising 2 to 12 carbon atoms. Preferred cycloaliphatic fragments are five or six membered saturated hydrocarbon rings, six membered hydrocarbon rings being particularly preferred. Preferred aromatic fragments are selected from the group consisting of phenyl rings and naphtyl rings, phenyl rings being particularly preferred. In a particularly preferred embodiment R comprises at least one fragment selected from the group consisting of a [1,3,5]triazinane-2,4,6-trione fragment and a biuret fragment.

Active methylene compounds as blocking agents are widely used as alternatives for classic blocked isocyanates, operating via an alternative reaction pathway, not yielding an intermediate isocyanate but cross-linking the system e.g. via ester formation as disclosed in Progress in Organic Coatings, 36, 148-172 (1999), paragraph 3.8.

Preferred examples of active methylene group blocked isocyanates are given by Table 2.

TABLE 2

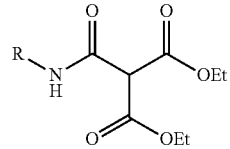 AMBI-1

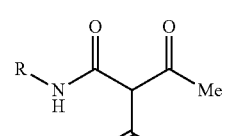 AMBI-2

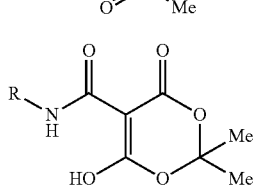 AMBI-3

TABLE 2-continued

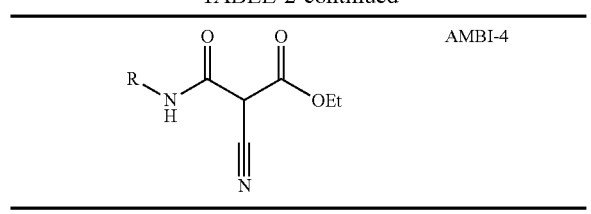

AMBI-4

In the above four compounds, R represents the residue of a difunctional, multifunctional or polymeric blocked isocyanate or active methylene group blocked isocyanate. Difunctional and multifunctional blocked isocyanates or active methylene group blocked isocyanates are preferred. In a further preferred embodiment, R represents a hydrocarbon group, further functionalized with at least one and preferably two or more blocked isocyanates or active methylene group blocked isocyanates, where the blocked isocyanates can be the same as or different from the first active methylene group blocked isocyanate listed above. The hydrocarbon group preferably comprises no more than 40 carbon atoms, more preferably no more than 30 carbon atoms and most preferably between 8 and 25 carbon atoms. Di- or multifunctional active methylene group blocked isocyanates are preferred, all blocking functional groups being the same being particularly preferred. In a further preferred embodiment R comprises, aliphatic, cycloaliphatic or aromatic fragments or combinations thereof. Preferred aliphatic fragments are linear or branched saturated hydrocarbon chains comprising 2 to 12 carbon atoms. Preferred cycloaliphatic fragments are five or six membered saturated hydrocarbon rings, six membered hydrocarbon rings being particularly preferred. Preferred aromatic fragments are selected from the group consisting of phenyl rings and naphtyl rings, phenyl rings being particularly preferred. In a particularly preferred embodiment R comprises at least one fragment selected from the group consisting of a [1,3,5]triazinane-2,4,6-trione fragment and a biuret fragment.

In a preferred embodiment, the blocked isocyanate is a polyfunctional blocked isocyanate having two to six blocked isocyanate functions. Tri- and tetrafunctional blocked isocyanates are particularly preferred.

Preferred blocked isocyanates are precursors capable of forming a di- or multifunctional isocyanate upon thermal activation selected from the group of hexamethylene diisocyanate, isophorone diisocyanate, tolyl diisocyanate, xylylene diisocyanate, a hexamethylene diisocyanate trimer, trimethylhexylene diisocyanate, diphenylmethane diisocyanate, dicyclohexylmethane diisocyanate and condensation products of one or more of the previous isocyanates. Other preferred blocked isocyanates are derivatives from the Takenate™ series of isocyanates (Mitsui), the Duranate™ series (Asahai Kasei Corporation) and the Bayhydur™ series (Bayer AG).

Suitable blocked isocyanates can be selected from the Trixene™ series (Baxenden Chemicals LTD) and the Bayhydur™ series (Bayer AG).

Particularly preferred examples of blocked isocyanates are given below in Table 3 without being limited thereto.

TABLE 3

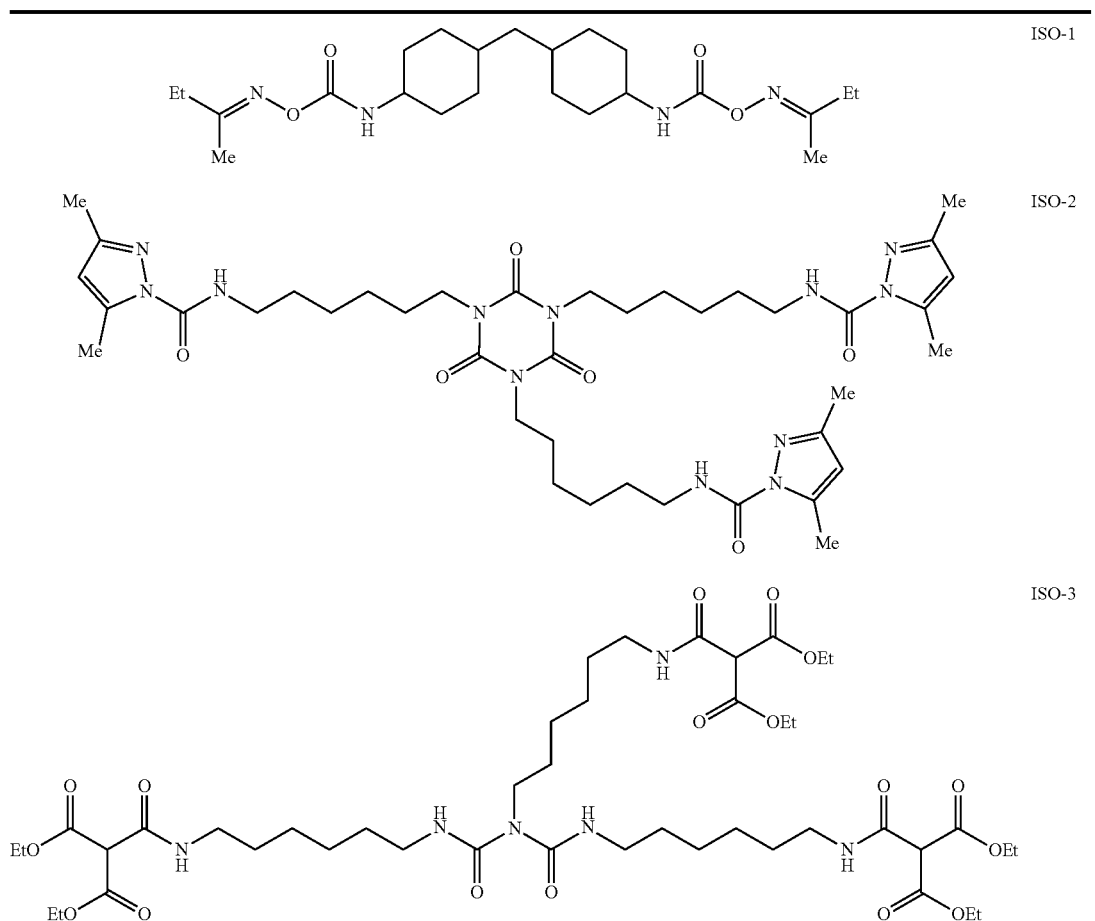

TABLE 3-continued
| | |
|---|---|
| 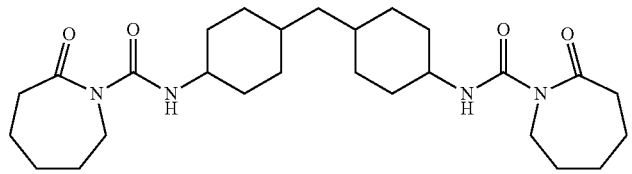 [SMILES: O=C1CCCCCN1C(=O)NC1CCC(CC2CCC(NC(=O)N3CCCCCC3=O)CC2)CC1] | ISO-4 |
| 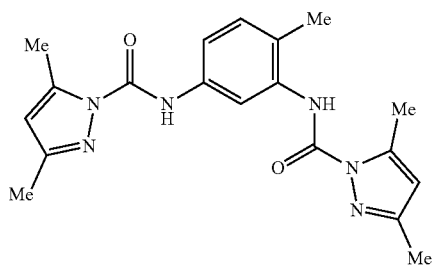 [SMILES: Cc1cc(C)n(C(=O)Nc2ccc(C)c(NC(=O)n3nc(C)cc3C)c2)n1] | ISO-5 |
| 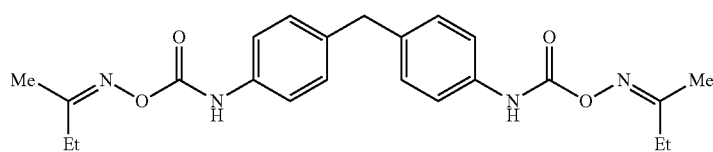 [SMILES: CC/C(C)=N\OC(=O)Nc1ccc(Cc2ccc(NC(=O)O/N=C(/C)CC)cc2)cc1] | ISO-6 |
| 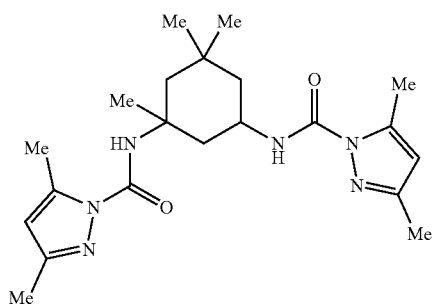 [SMILES: Cc1cc(C)n(C(=O)NC2CC(C)(C)CC(C)(NC(=O)n3nc(C)cc3C)C2)n1] | ISO-7 |
| 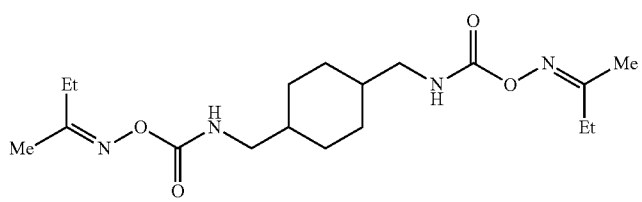 [SMILES: CC/C(C)=N\OC(=O)NCC1CCC(CNC(=O)O/N=C(/C)CC)CC1] | ISO-8 |
| 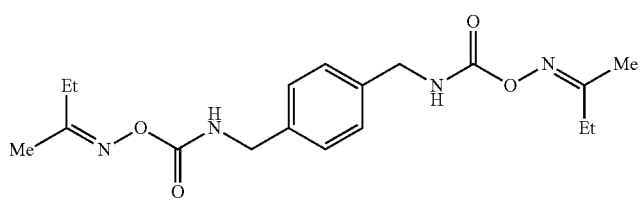 [SMILES: CC/C(C)=N\OC(=O)NCc1ccc(CNC(=O)O/N=C(/C)CC)cc1] | ISO-9 |
| 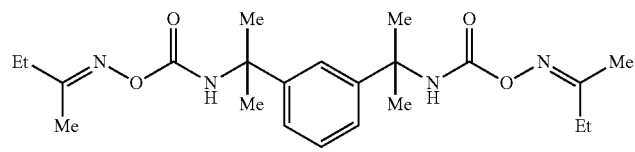 [SMILES: CC/C(C)=N\OC(=O)NC(C)(C)c1cccc(C(C)(C)NC(=O)O/N=C(\C)CC)c1] | ISO-10 |

In a preferred embodiment, one thermal cross-linker is used, but a combination of two, three or more different thermal cross-linkers may be used.

The weight ratio of the thermal cross-linker over the polymeric resin is preferably between 10 and 0.25, more preferably between 4 and 0.5. A ratio smaller than 0.25 tends to decrease the wet and crock fastness, while a ratio larger than 10 tends to decrease the colloidal stability of the composite resin particles.

In a preferred embodiment, the activation temperature of the thermal cross-linker is between 80° C. and 200° C., more preferably between 100° C. and 160° C. The activation temperature is preferably no more than 160° C. for preserving the structural integrity of certain textiles.

The thermal cross-linker has a solubility in ethyl acetate of preferably at least 50 g per litre at 20° C., more preferably at least 100 g per litre at 20° C., and most preferably at least 200 g per litre at 20° C.

Catalysts

In a preferred embodiment of the present invention, a catalyst is present to accelerate reaction of the thermally reactive chemistry in the composite resin particles. The catalyst can be present in the aqueous continuous phase and/or in the composite resin particle.

The catalyst is preferably selected from the group consisting of a Brönsted acid, a Lewis acid and thermal acid generator.

Preferred examples of a Brönsted acid include organic and inorganic acids with a sufficiently low pKa. Sulfonic acids, mono-esters of phosphoric acid and mono-esters of sulphuric acid are preferred organic acids. Sulfonic acids are particularly preferred. Typical examples of suitable sulfonic acids are p.toluene sulfonic acid, benzene sulfonic acid, methane sulfonic acid and camphor sulfonic acid.

Preferred examples of a Lewis acid include tin based Lewis acids such as dibutyltin dilaurate and dibutyltin oxide, zirconium based Lewis acids, such as zirconium acetylacetonate, titanium base Lewis acids, such as tertaalkoxy titanates, boron based Lewis acids and aluminium based Lewis acids. Zirconium based Lewis acids are particularly preferred.

Preferred examples of a thermal acid generator include ammonium salts of strong acids such as p.toluene sulfonic acid ammonium salt, esters of sulfonic acids, phosphoric acids and phosponic acids, trihalomethyl compounds such as tribromomethyl phenyl sulfone diaryl iodoniums, triaryl sulfoniums, α-disulfones and oxime sulfonates. Further examples of thermal acid generators can be found in paragraphs [52] to [72] and paragraphs [0155] to [0163] of WO 2015/091688 (AGFA).

The weight ratio of the catalyst over the thermal cross-linker is preferably between 0.005 and 0.25, more preferably between 0.01 and 0.1. A ratio smaller than 0.005 tends not to increase the reaction speed, while a ratio larger than 0.25 tends to deteriorate the stability of the ink.

Polymeric Resins

The polymeric resin present in the thermally reactive composite resin particles contains functional groups suitable for reacting with the thermal cross-linker. By crosslinking, a polymeric network is formed which traps or "fixes" the colorant to a substrate. For this reason, the polymeric resin is sometimes also called a polymeric fixing agent. The term "fixing agent" is well-known to those in printing textile and used for a polymer that increases the wet and crock fastness by fixation of a colorant on textiles.

The polymeric resin contains functional groups that are suitable for reacting with the thermal cross-linker. The skilled person knows which functional groups are suitable for reacting with which type of thermal cross-linker, or can derive such information easily from a chemistry handbook, such as ODIAN, George. Principles of Polymerization. 4th edition. Hoboken, N.J.: John Wiley, 2004. p. 117-134.

In a particularly preferred embodiment, the polymeric resin present in the thermally reactive composite resin particles contains functional groups suitable for reacting with a thermally activated blocked isocyanate.

In a further preferred embodiment, the polymeric resin present in the thermally reactive composite resin particles capable of reacting with a thermally activated blocked isocyanate is a polymer containing functional groups that are selected from a hydroxyl group, a primary amine group, a secondary amine group, an amide group, a urethane group, an urea group, a carboxylic acid group or salt thereof and an epoxide group.

The general reaction scheme for thermal crosslinking based on blocked isocyanates is given by:

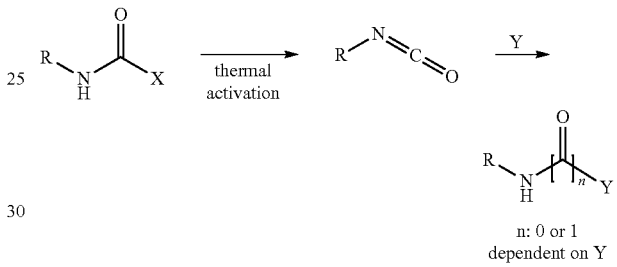

n: 0 or 1
dependent on Y

Typical reaction products from the above general reaction scheme are given by Table 4 for the preferred functional groups present in the polymeric resin of the thermally reactive composite resin particles.

TABLE 4

| Functional group in polymeric resin | General structure of Y | General structure of reaction product upon cross-linking |
|---|---|---|
| Hydroxyl | R'—OH | R'—O—C(=O)—N(H)—R |
| Primary or secondary amine | R'—N(H)—R'' | R'—N(R'')—C(=O)—N(H)—R |
| Carboxylic acid | R'—C(=O)—OH | R'—C(=O)—N(H)—R |
| Urethane | R'—N(H)—C(=O)—O—R'' | R'—N(C(=O)—NHR)—C(=O)—O—R'' |

TABLE 4-continued

| Functional group in polymeric resin Y | General structure of Y | General structure of reaction product upon cross-linking |
|---|---|---|
| Ureum | | |
| Amide | | |
| Epoxy | | |

The hydroxyl group can be directly coupled to the polymeric backbone or linked to the polymeric backbone via a linking group, The hydroxyl group is preferably selected from the group consisting of a primary and a secondary aliphatic alcohol, a primary alcohol being particularly preferred. Preferred linking groups are optionally substituted aliphatic linking groups, optionally containing ether functions in the linking group.

The amine group for reacting with the thermal cross-linker is a primary or secondary aromatic or aliphatic amine, an aliphatic amine being particularly preferred. Secondary amines can be coupled to the polymer backbone, optionally via a linking group or being part of the polymer backbone. Primary amines are coupled to the backbone, optionally via a divalent linking group. Preferred linking groups are optionally substituted aliphatic linking groups, optionally containing ether functions in the linking group. Aliphatic primary amines, coupled optionally via a divalent linking to the polymer backbone are particularly preferred.

The urethane group for reacting with the thermal cross-linker can be coupled to the polymer backbone, optionally via a linking group or being part of the polymer backbone. Urethane groups being part of the backbone are particularly preferred. In a particularly preferred embodiment, the urethane group is an aliphatic urethane group, meaning that both R" and R" represent optionally substituted aliphatic moieties. If the urethane group is coupled to the backbone, optionally via a divalent linking group, the urethane moiety is preferably represented by R-(L)$_n$-NH—(C=O)—O—R" or by R-(L)$_n$-O—(C=O)—NH—R', wherein R represents the polymer backbone, n represent 0 or 1, L represents a divalent linking group selected from the group consisting of an optionally substituted alkylene group, an optionally substituted arylene group, an optionally substituted alkarylene group and an optionally substituted aralkylene group and R' is selected from the group consisting of an optionally substituted alkyl group and an optionally substituted aryl group, an optionally substituted alkyl group being particularly preferred.

The urea group for reacting with the thermal cross-linker can be coupled to the polymer backbone, optionally via a linking group or being part of the polymer backbone. Urea groups being part of the backbone are particularly preferred. In a particularly preferred embodiment, the urea group is an aliphatic urea group, meaning that both R', and R" represent optionally substituted aliphatic moieties and R''' is selected from the group consisting of hydrogen and an optionally substituted aliphatic group. If the urea group is coupled to the backbone, optionally via a divalent linking group, the urea moiety is preferably represented by R-(L)$_n$-NH—(C=O)—NH—R', wherein R represents the polymer backbone, n represent 0 or 1, L represents a divalent linking group selected from the group consisting of an optionally substituted alkylene group, an optionally substituted arylene group, an optionally substituted alkarylene group and an optionally substituted aralkylene group and R' is selected from the group consisting of a hydrogen, an optionally substituted alkyl group and an optionally substituted aryl group, an optionally substituted alkyl group being particularly preferred.

The amide group for reacting with the thermal cross-linker can be coupled to the polymer backbone, optionally via a linking group or being part of the polymer backbone, amide groups coupled to the backbone, optionally via a divalent linking group being particularly preferred. In a particularly preferred embodiment, the amide group is represented by R—NH—(CO)—R', where R represents the polymer backbone and R' is selected from the group consisting of hydrogen, an optionally substituted alkyl group and an optionally substituted aryl group. In an even more preferred embodiment the amide group is represented by R—(CO)—NH—R', where R represents the polymer backbone and R' is selected from the group consisting of hydrogen, an optionally substituted alkyl group and an optionally substituted aryl group. Acryl amide and methacrylamide based polymers and copolymers are particularly preferred.

The carboxylic acid group for reacting with the thermal cross-linker is preferably a group represented by R-(L)$_n$-COOH, wherein R represents the polymeric backbone, n is an integer representing 0 or 1; and L is a linking group selected from the group consisting of an optionally substituted alkylene group, an optionally substituted arylene group, an optionally substituted alkarylene group and an optionally substituted aralkylene group. Acrylic acid and methacrylic acid based copolymers are particularly preferred.

The epoxide group for reacting with the thermal cross-linker is preferably coupled to the polymeric backbone, optionally via a divalent linking group. The epoxide compound for reacting with the thermal cross-linker is preferably represented by:

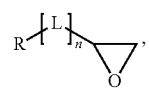

wherein R represents the polymeric backbone, n is an integer representing 0 or 1; and L is a linking group selected from the group consisting of an optionally substituted alkylene group, an optionally substituted arylene group, an optionally substituted alkarylene group and an optionally substituted aralkylene group.

In a more preferred embodiment, the polymeric resin has an amphiphilic nature. An amphiphilic polymer is defined as a polymer comprising at least one hydrophobic polymeric segment, derived from monomeric components which are substantially water insoluble, and at least one hydrophilic polymeric segment comprising at least one functional group selected from ionic or non ionic water solubilizing groups.

The advantage of using an amphiphilic polymer is that the hydrophilic polymeric segments can be used to disperse the composite resin particles by steric stabilization in the aqueous medium. If the content of the at least one hydrophilic polymeric segment in the amphiphilic polymer is sufficient, then the thermally reactive composite resin particles can be made self-dispersing, meaning that no extra dispersing agent or surfactant is necessary to obtain a stable dispersion of the composite resin particles.

If the polymeric resin is not an amphiphilic polymer, a dispersing agent or surfactant is required to obtain a stable dispersion of the composite resin particles. This dispersing agent is preferably selected from the group consisting of anionic, non ionic, cationic and amphoteric surfactants, (meth)acrylate ester-(meth)acrylic acid copolymers, styrene-(met)acrylic acid copolymers, styrene-maleic acid copolymers, styrene-sulfonic acid copolymers, ethyleneoxide-propylene oxide copolymers. Anionic and non ionic surfactants are particularly preferred In the amphiphilic polymer used as polymeric resin, the hydrophilic polymeric segment of the polymeric resin preferably comprises at least one functional group selected from the group consisting of a sulfonic acid or salt thereof, a carboxylic acid or salt thereof, a —$(CH_2CH_2O)_n$—H group, where n represents an integer from 2 to 25 and a C2 to C12 alipahtic group substituted by hydroxyl groups where the carbon on hydroxyl ratio is 2 or less.

More preferably the hydrophilic polymeric segment of the polymeric resin comprises at least one functional group selected from the group consisting of: —$COO^-M^+$, —$SO_3^-M^+$, —O—$PO_3^-M^+$, —O—$SO_3^-M^+$, —$PO_3^-M^+$; wherein $M^+$ represents $H^+$ or a cation selected from the group consisting of $Na^+$, $Li^+$, $K^+$ and $NH_4^+$.

Substantially water insoluble, as used for the monomeric components constituting the at least one hydrophobic polymeric segment in the amphiphilic polymeric resin, is defined as preferably having a solubility in water of less than 10 g per litre at 20° C. and a pH of 7.

Particularly preferred hydrophobic polymeric segments of the polymeric resin can be selected from styrene based, acrylate based, vinyl ester based, vinyl acetal based, polyurethane based, polyester based or polyether based polymeric segments or combinations thereof.

The polymeric resin has a solubility in ethyl acetate of preferably at least 10 g per litre at 20° C., more preferably at least 20 g per litre at 20° C., and most preferably at least 50 g per litre at 20° C.

The polymeric resin can be prepared by addition polymerisation, polycondensation, ringopening polymerisation or combinations thereof.

In a preferred embodiment, the polymeric resin is prepared by post modification of polymers, such as acetalysation or acylation of hydroxyl containing polymers such as poly(vinyl alcohol), ethylene vinyl alcohol copolymers or polysaccharides.

Any polymeric structure such as a random copolymer, a graft copolymers, a block copolymer and a gradient copolymer can be used in the present invention, a random and a graft copolymer being particularly preferred.

In a preferred embodiment, the polymeric resin has an average numeric molecular weight $M_n$ between 1000 and 50000, more preferably between 2000 and 40000 and most preferably between 5000 and 25000.

In a preferred embodiment, the polymeric resin has a weight average molecular weight between 2000 and 150000, more preferably between 4000 and 75000 and most preferably between 5000 and 40000, determined by size exclusion chromatography, relative to polystyrene standards.

Preferred polymeric resins comprise non ionic hydrophilic segments, preferably selected from the group consisting of an oligo- or poly(ethylene oxide) and an di- or multiple hydroxyl group containing group.

In a preferred embodiment, the polymer fixing agent is a poly(vinyl alcohol) or a vinyl alcohol copolymer derivative, poly(vinyl acetals) and poly(vinyl esters) being particularly preferred.

In another preferred embodiment, the polymeric resin is a styrene based polymer, preferably copolymerized with a poly(ethylene glycol) containing monomer.

In a preferred embodiment, a single type of polymeric resin is used, but a combination of two or more polymeric resins may be used.

The content of the polymeric resin in the composite resin particles is preferably between 10 and 75 wt %, more preferably between 20 and 65 wt %, wherein the weight percentage (wt %) is based on the total weight of the composite resin particles.

Aqueous Medium

The composite resin particles are dispersed into an aqueous medium. The aqueous medium may consist of water, but preferably includes one or more organic solvents. Other compounds, such as e.g. monomers and oligomers, surfactants, colorants, alkaline compounds and light stabilizers, may be dissolved or dispersed in the aqueous medium.

The one or more organic solvents may be added for a variety of reasons. For example, it can be advantageous to add a small amount of an organic solvent to improve the dissolution of a compound in the aqueous medium.

The aqueous medium may contain at least one humectant to prevent the clogging of nozzles in an inkjet print head, due to its ability to slow down the evaporation rate of the inkjet ink, especially the water in the inkjet inkjet printing liquid. The humectant is an organic solvent having a higher boiling point than water.

Suitable humectants include triacetin, N-methyl-2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof. A preferred humectant is glycerol.

The humectant is preferably added to the inkjet printing liquid in an amount of 0.1 to 20 wt % based on the total weight of the inkjet printing liquid.

The aqueous medium preferably includes at least one surfactant. The surfactant can be anionic, cationic, non-ionic, or zwitter-ionic and is preferably added in an amount below 10 wt %, more preferably below 5 wt % based on the total inkjet ink weight.

Suitable surfactants include fatty acid salts, ester salts of a higher alcohol, alkylbenzene sulphonate salts, sulphosuccinate ester salts and phosphate ester salts of a higher alcohol (e.g. sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 440, 465 and TG available from AIR PRODUCTS & CHEMICALS INC.

A biocide may be added to the aqueous medium to prevent unwanted microbial growth, which may occur in the ink-jet ink over time. The biocide may be used either singly or in combination.

Suitable biocides for the ink-jet ink of the present invention include sodium dehydroacetate, 2-phenoxyethanol, sodium benzoate, sodium pyridinethion-1-oxide, ethyl p-hydroxybenzoate and 1,2-benzisothiazolin-3-one and salts thereof.

Preferred biocides are Proxel™ GXL and Proxel™ Ultra 5 available from ARCH UK BIOCIDES and Bronidox™ available from COGNIS.

A biocide is preferably added to the aqueous medium in an amount of 0.001 to 3 wt. %, more preferably 0.01 to 1.0 wt. %, each based on the inkjet ink.

The aqueous medium may further comprise at least one thickener for viscosity regulation of the inkjet printing liquid.

Suitable thickeners include urea or urea derivatives, hydroxyethylcellulose, carboxymethylcellulose, hydroxypropylcellulose, derived chitin, derived starch, carrageenan, pullulan, proteins, poly(styrenesulphonic acid), poly(styrene-co-maleic anhydride), poly(alkyl vinyl ether-co-maleic anhydride), polyacrylamid, partially hydrolyzed polyacrylamid, poly(acrylic acid), poly(vinyl alcohol), partially hydrolyzed poly(vinyl acetate), poly(hydroxyethyl acrylate), poly(methyl vinyl ether), polyvinylpyrrolidone, poly(2-vinylpyridine), poly(4-vinylpyridine) and poly(diallyldimethylammonium chloride).

The thickener is added preferably in an amount of 0.01 to 20 wt % , more preferably 0.1 to 10 wt % based on the inkjet printing liquid.

The aqueous medium may contain at least one pH adjuster. Suitable pH adjusters include organic amines, NaOH, KOH, NEt$_3$, NH$_3$, HCl, HNO$_3$ and H$_2$SO$_4$. In a preferred embodiment, the inkjet ink has a pH higher than 7.

Optothermal Converting Agents

The inkjet printing liquid, preferably the composite resin particles, may contain an optothermal converting agent for the conversion of electromagnetic radiation into heat when the inkjet printed image is exposed to an infrared light source, such as a laser, a laser diode or a LED.

The optothermal converting agent may be any suitable compound absorbing in the wavelength range of emission by the infrared light source.

The optothermal converting agent is preferably an infrared dye as this allows easy handling into the inkjet printing liquid, especially into the composite resin particles. The infrared dye may be included into the aqueous medium, but is preferably included in the composite resin particle. In the latter, the heat transfer is usually much more effective.

Suitable examples of infrared dyes include, but are not limited to, polymethyl indoliums, metal complex IR dyes, indocyanine green, polymethine dyes, croconium dyes, cyanine dyes, merocyanine dyes, squarylium dyes, chalcogenopyryloarylidene dyes, metal thiolate complex dyes, bis(chalcogenopyrylo)polymethine dyes, oxyindolizine dyes, bis(aminoaryl)polymethine dyes, indolizine dyes, pyrylium dyes, quinoid dyes, quinone dyes, phthalocyanine dyes, naphthalocyanine dyes, azo dyes, (metalized) azomethine dyes and combinations thereof.

The one or more optothermal converting agents are preferably present in the range of 0.01 to 10 wt % based on the total weight of the inkjet printing liquid.

Colorants

The inkjet printing liquid may contain one or more colorants. The colorants may be dyes, pigments or a combination thereof. Organic and/or inorganic pigments may be used.

The colorant for use is not particularly limited, and may be selected properly from various known colorants according to applications. For example, use of a pigment is preferable for forming an image superior in light fading and weather resistance. On the contrary, use of a dye is preferable, for forming an image superior in transparency on a transparent film. A combination of both a dye and a colorant can be used to obtain a better compromise on image stability, due to the fact that pigments are generally less susceptible to light fading, and colour gamut, due to the fact that dyes generally have a higher brilliance.

A colorant may be present in at least some, preferably all, of the thermally reactive composite resin particles in the inkjet printing liquid according to the present invention. The colorant in the thermally reactive composite particles may be a pigment, but is preferably a dye. The light fastness, wet fastness and crock fastness is generally improved by including the dye in the composite resin particles instead of the aqueous medium.

In the aqueous medium, dispersed colorants are particularly preferred. The dispersed colorants are preferably colour pigments. Any stabilization mechanism, both electrostatic and steric, can be used to stabilize the pigment dispersion in water. Pigments dispersed with polymeric dispersing agents and self dispersing pigments are particularly preferred. Self dispersing pigments are defined as pigments wherein the pigment stabilizing group, usually an ionic group, is covalently attached to the surface of the pigment.

In the presence of reactive composite resin particles, self-dispersing pigments are preferred over pigments dispersed with polymeric dispersing agents as in the latter case the polymeric dispersant can desorb from the pigment surface and adsorb on the reactive composite resin particles thereby causing flocculation and sedimentation.

In a preferred embodiment, the weight ratio of colorant over the composite resin particles is in the range of 4:1 to 1:4, more preferably 2:1 to 1:2.

The colorants may be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley—VCH, 2004. ISBN 3527305769.

Suitable colour pigments are disclosed in paragraphs [128] to [0138] of WO 2008/074548 (AGFA GRAPHICS).

An advantage of including a colour pigment in the composite resin particles of the inkjet printing liquid according to the present invention is that high dispersion stability of the pigment is not really necessary as the dispersion stability is accomplished by the composite resin particles in the inkjet printing liquid. As the pigment is included in the composite resin particles, there exists also no competition for the polymeric dispersant between the composite resin particles and the dispersed pigment in the aqueous medium.

A self-dispersible pigment is a pigment having on its surface covalently bonded anionic or cationic hydrophilic groups, such as salt-forming groups that allow the pigment to be dispersed in an aqueous medium without using a surfactant or a resin.

The technology for making self-dispersible pigments is well-known. For example, EP 906371 A (CABOT) discloses suitable surface-modified coloured pigment having attached hydrophilic organic groups containing one or more ionic groups or ionizable groups. Suitable commercially available self-dispersible colour pigments are, for example, the CAB-O-JET™ inkjet colorants from CABOT.

Pigment particles in inkjet inks should be sufficiently small to permit free flow of the ink through the inkjet-printing device, especially at the ejecting nozzles. It is also desirable to use small particles for maximum colour strength and to slow down sedimentation.

The average pigment particle size is preferably between 0.050 and 1 µm, more preferably between 0.070 and 0.300 µm and particularly preferably between 0.080 and 0.200 µm. Most preferably, the numeric average pigment particle size is no larger than 0.150 µm. The average particle size of pigment particles is determined with a Brookhaven Instruments Particle Sizer BI90plus based upon the principle of dynamic light scattering. The ink is diluted with ethyl acetate to a pigment concentration of 0.002 wt %. The measurement settings of the BI90plus are: 5 runs at 23° C., angle of 90°, wavelength of 635 nm and graphics=correction function However for white pigment inkjet inks, the numeric average particle diameter of the white pigment is preferably from 50 to 500 nm, more preferably from 150 to 400 nm, and most preferably from 200 to 350 nm. Sufficient hiding power cannot be obtained when the average diameter is less than 50 nm, and the storage ability and the jet-out suitability of the ink tend to be degraded when the average diameter exceeds 500 nm. The determination of the numeric average particle diameter is best performed by photon correlation spectroscopy at a wavelength of 633 nm with a 4 mW HeNe laser on a diluted sample of the pigmented inkjet ink. A suitable particle size analyzer used was a Malvern™ nano-S available from Goffin-Meyvis. A sample can, for example, be prepared by addition of one drop of ink to a cuvette containing 1.5 mL ethyl acetate and mixed until a homogenous sample was obtained. The measured particle size is the average value of 3 consecutive measurements consisting of 6 runs of 20 seconds.

Suitable white pigments are given by Table 2 in [0116] of WO 2008/074548 (AGFA GRAPHICS). The white pigment is preferably a pigment with a refractive index greater than 1.60. The white pigments may be employed singly or in combination. Preferably titanium dioxide is used as pigment with a refractive index greater than 1.60. Suitable titanium dioxide pigments are those disclosed in [0117] and in [0118] of WO 2008/074548 (AGFA GRAPHICS).

Also special colorants may be used, such as fluorescent pigments for special effects in clothing, and metallic pigments for printing a luxury look of silver and gold colours on textiles and other substrates.

Generally dyes exhibit a higher light fading than pigments, but cause no problems on jettability. In the most preferred embodiment, the dye is included in the composite resin particles.

The dye preferably has a solubility in ethyl acetate of at least 50 g per litre at 25° C., so that it can easily be included in substantial amounts in the composite resin particles. More preferably the dye has a solubility in water of no more than 5 g per litre at 25° C., so that it is not extracted from the composite resin particles by the aqueous medium.

The colorant are preferably present in the range of 0.1 to 30 wt % based on the total weight of the ink.

In a preferred embodiment, the coloured inkjet printing liquid according to the present invention include 1 to 20 wt % pigment, more preferably 4 to 15 wt % pigment and most preferably 5 to 10 wt % pigment. For white inkjet inks, the white pigment is preferably present in an amount of 5% to 40% by weight of the inkjet ink, and more preferably 7% to 30%. An amount of less than 5% by weight cannot achieve sufficient covering power.

Dispersants

A polymeric dispersant may be used for colour pigments and/or for the composite resin particles, especially if the latter contains no amphiphilic polymeric resin.

Suitable polymeric dispersants are copolymers of two monomers but they may contain three, four, five or even more monomers. The properties of polymeric dispersants depend on both the nature of the monomers and their distribution in the polymer. Copolymeric dispersants preferably have the following polymer compositions:

statistically polymerized monomers (e.g. monomers A and B polymerized into ABBAABAB);
alternating polymerized monomers (e.g. monomers A and B polymerized into ABABABAB);
gradient (tapered) polymerized monomers (e.g. monomers A and B polymerized into AAABAABBABBB);
block copolymers (e.g. monomers A and B polymerized into AAAAABBBBBB) wherein the block length of each of the blocks (2, 3, 4, 5 or even more) is important for the dispersion capability of the polymeric dispersant;
graft copolymers (graft copolymers consist of a polymeric backbone with polymeric side chains attached to the backbone); and
mixed forms of these polymers, e.g. blocky gradient copolymers.

Suitable dispersants are DISPERBYK™ dispersants available from BYK CHEMIE, JONCRYL™ dispersants available from JOHNSON POLYMERS and SOLSPERSE™ dispersants available from ZENECA. A detailed list of non-polymeric as well as some polymeric dispersants is disclosed by MC CUTCHEON. Functional Materials, North American Edition. Glen Rock, N.J.: Manufacturing Confectioner Publishing Co., 1990. p. 110-129.

The polymeric dispersant has preferably a number average molecular weight $M_n$ between 500 and 30000, more preferably between 1500 and 10000.

The polymeric dispersant has preferably a weight average molecular weight Mw smaller than 100,000, more preferably smaller than 50,000 and most preferably smaller than 30,000.

Stabilizers

The inkjet printing liquid may contain a stabilizer, such as a light stabilizer for the colorant.

If the inkjet printing liquid contains a dye in a composite resin particle, then preferably also a light stabilizer is included in the composite resin particle.

The light stabilizer may be present as a low molecular weight compound, or it may be grafted on an oligomer or polymer, such as e.g. the polymeric resin.

As the antioxidant for improving storage stability of an image, various organic and metal complex type fading preventives can be used in the invention. Organic fading preventives include hydroquinones, alkoxyphenols, dialkoxyphenols, phenols, anilines, amines, indanes, coumarones, alkoxyanilines and heterocycles, while metal complexes include nickel complexes and zinc complexes. More specifically, compounds as described in "Research Disclosure, No. 17643, VII, Section I or J, No. 15162, No. 18716, left column on page 650, No. 36544, page 527, No. 307105, page 872, and the patent cited in No. 15162, and compounds embraced in the formula of the typical compounds and compound examples described on pages 127 to 137 of JP 62215272 A (FUJI).

The stabilizer is added in an amount of 0.1 to 30 wt %, preferably 0.5 to 10 wt % based on the total weight of the inkjet ink.

Inkjet Printing Methods

The inkjet printing liquid as described above can be advantageously used in an inkjet printing method for printing an image on a substrate.

A preferred inkjet printing method includes, in order, the steps of:
- jetting an image on a substrate with one or more inkjet printing liquids containing resin particles in an aqueous medium, wherein the resin particles are composite resin particles containing a) at least one thermal cross-linker; and b) at least one polymeric resin containing functional groups suitable for reacting with the thermal cross-linker; and
- applying indirectly and/or directly a heat treatment to the image.

An indirect heat treatment is applied to the image by using infrared light, e.g. from IR LEDs, while a direct heat treatment is usually applied by heat convection or heat conduction. For indirect heat treatment by infrared light, preferably an optothermal converting agent, as described in some detail here above, is included for reasons of efficiency as none of the other ingredients of the inkjet printing liquid may exhibit a substantial infrared absorption.

There is no real limitation on the type of substrate for inkjet printing one or more inkjet printing liquids of the invention on. The substrates are preferably selected from the group consisting of textile, metal, leather, synthetic leather, glass, wood, ceramics, stone, concrete, paper, polypropylene and polyvinylchloride. Polymeric substrates are generally less suitable, especially in the case of thermosensitive polymeric substrates that structurally deform or decompose at temperatures of 150° C. for 5 minutes, any protective measures like a heat sink being absent.

The substrate may be porous, as e.g. textile, paper and card board substrates, or may be a substantially non-absorbing substrate such as glass or metal.

The substrate may also be a paper substrate, such as wallpaper but also paper of higher grammage, usually referred to as boards, such as white lined chipboard, corrugated board and packaging board.

There is no restriction on the shape of the substrate. It can be a flat sheet, such a paper sheet or a glass window, or it can be a three dimensional object like a glass bottle, building materials, a car or any other vehicle.

In a preferred embodiment of the inkjet printing method, the substrate is selected from textile, metal, leather, synthetic leather, pvc, glass, wood, ceramics, stone, and concrete, more preferably the substrate is textile or leather.

A major advantage of the current inkjet printing method is that not only a wide range of textiles can be printed upon, but that after the fixation process (heat treatment) no post-treatments are necessary. For example, a classic washing process to remove reactive or acid dyes that are unfixed from the textile is not necessary. In addition, also many pre-treatments of textiles can be avoided. For example, where classic inkjet printing processes require the application of a water-soluble polymer to the textile prior to inkjet printing in order to prevent ink bleeding, this is usually not necessary with inkjet printing liquids and inkjet inks of the present invention containing composite resin particles The avoidance of these pre- and post treatment speed-up and simplify the manufacturing of inkjet printed textiles, resulting in an economical bonus. For example, no cumbersome ink swaps have to be performed in the inkjet printer, when changing the type of textile substrate. Also waste generated in the post-treatment can be avoided.

Suitable textiles can be made from many materials. These materials come from four main sources: animal (e.g. wool, silk), plant (e.g. cotton, flax, jute), mineral (e.g. asbestos, glass fibre), and synthetic (e.g. nylon, polyester, acrylic). Depending on the type of material, it can be knitted, woven or non-woven textile.

The textile substrate is preferably selected from the group consisting of cotton textiles, silk textiles, flax textiles, jute textiles, hemp textiles, modal textiles, bamboo fibre textiles, pineapple fibre textiles, basalt fibre textiles, ramie textiles, polyester based textiles, acrylic based textiles, glass fibre textiles, aramid fibre textiles, polyurethane textiles (e.g. Spandex or Lycra™), Tyvek™ and mixtures thereof.

Suitable polyester textile includes polyethylene terephthalate textile, cation dyeable polyester textile, acetate textile, diacetate textile, triacetate textile, polylactic acid textile and the like.

Applications of these textiles include automotive textiles, canvas, banners, flags, interior decoration, clothing, hats, shoes, floor mats, doormats, brushes, mattresses, mattress covers, linings, sacking, stage curtains, flame-retardant and protective fabrics, and the like. Polyester fibre is used in all types of clothing, either alone or blended with fibres such as cotton. Aramid fibre (e.g. Twaron) is used for flame-retardant clothing, cut-protection, and armor. Acrylic is a fibre used to imitate wools.

Inkjet Printing Devices

The inkjet printing liquids and inks may be jetted by one or more print heads ejecting small droplets in a controlled manner through nozzles onto a substrate, which is moving relative to the print head(s).

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head. However the inkjet printing method according to the present invention is not restricted to piezoelectric inkjet printing. Other inkjet print heads can be used and include various types, such as a continuous type, a thermal print head type and a valve jet type.

A valve jet is especially preferred as inkjet print head in application when the image quality does not have to meet extremely high standards or when large amount of inkjet printing liquids have to be deposited on the substrate.

The inkjet print head normally scans back and forth in a transversal direction across the moving ink-receiver surface. Often the inkjet print head does not print on the way back. Bi-directional printing, also known as multi-pass printing, is preferred for obtaining a high areal throughput. Another preferred printing method is by a "single pass printing process", which can be performed by using page wide inkjet print heads or multiple staggered inkjet print heads which cover the entire width of the ink-receiver surface. In a single pass printing process the inkjet print heads usually remain stationary and the substrate surface is transported under the inkjet print heads.

Curing Devices

The inkjet printer normally contains a drying unit for removing water and organic solvents in the inkjet printed image. However, sometimes this may be combined with a curing means for curing the thermal reactive chemistry from the composite resin particles.

Alternatively, the inkjet printer may include only the drying unit for removing water and organic solvents in the inkjet printed image, while the thermal curing energy is applied afterwards, i.e. the thermal curing means is located offline, for example, downstream in a textile production line.

The thermal curing means for cross-linking the at least one thermal cross-linker and the at least one polymeric resin may also be combined with drying unit for the water and organic solvents of the inkjet printing liquid, meaning that drying and thermal curing is performed by the same device In a preferred embodiment, the inkjet printer is preferably equipped with a thermal curing means selected from a heat convection device, such as an oven, a heat conduction device, such as heated metal plates, and an infrared light source, such as an infrared laser, one or more infrared laser diodes or infrared LEDs.

In a particularly preferred, the drying and/or thermal curing is performed using NIR-technology as available from ADPHOS.

EXAMPLES

Measurement Methods
1. Average Particle Size of Composite Resin Particles

The average particle size was measured using a Zetasizer™ Nano-S (Malvern Instruments, Goffin Meyvis).
2. Viscosity of Inkjet Printing Liquids The viscosity of an ink jet printing liquid was measured at 20° C. temperature using a capillary viscometer.
3. Surface Tension of Inkjet Printing Liquids The static surface tension of the inkjet printing liquids was measured with a KRÜSS tensiometer K9 from KRÜSS GmbH, Germany at 25° C. after 60 seconds.
4. Dry Rubbing The test is based on the standard ISO 105 X12. The test consists in doing 10 double wipes on the printed sample with a Crockmeter (model M238AA). A piece of white cotton is placed on the rubbing finger and held in place with the locking ring. The sample is placed on sand paper (to prevent it from moving during the rubbing), the printed side facing up, the sample is held in place with a metal piece. The rubbing is done by turning the handle 10 times (a counter on top of the Crockmeter indicates the number of rotations). The result is assessed first visually with the piece of blank fabric (color transfer or not) and then with the sample itself (color fastness).
5. Washing Test This test is based on ISO 105 C06. Beforehand, the L*a*b and color density of the sample must be measured.

A solution of commercial detergent (laundry) at 4 g/L is prepared in a flask. A medium amount of this detergent solution (between 70 to 100 mL, depending on the size of the sample to wash), is placed in a conical flask, and placed on a heating and stirring plate. Depending on the ISO standard tested, the solution can be heated to 60° C. or 95° C. (depending on which ISO we want to base the results, also depending on the applications), and is stirred at a medium speed. Once the solution is at desired temperature, a piece of the sample is placed in the solution, as well as a blank piece of the same fabric, or a blank piece of multifabric textile (SDC Multifibre DW). The fabric pieces must be entirely soaked in the solution.

The washing cycle lasts for 30 minutes. The temperature must be checked during the washing, to be sure to keep it steady. The fabric pieces are then removed from the detergent solution, and placed in 100 mL of distilled water (room temperature) and stirred for 1 min, this step is repeated twice. The samples are then dried at room temperature or in an oven at a temperature at 50° C.

Once dry, the L*a*b and color density are measured again. The change in color of the print is assessed by Table 5.

TABLE 5

| L*a*b difference | Fastness grade |
| --- | --- |
| 0.0-2.0 | Excellent |
| 2.1-7.4 | Acceptable |
| >7.5 | Poor |

Materials

All materials used in the following examples were readily available from standard sources such as Sigma-Aldrich (Belgium) and Acros (Belgium) unless otherwise specified. The water used was demineralized water.

Proxel™ K is a 5 w % aqueous solution of CASRN127553-58-6, prepared by dilution of PROMEX CLEAR, supplied by PROM CHEM UK.

Hostaperm™ B5G-KR is a pigment blue 15:3, supplied by CLARIANT

Trixene™ B17952 is a blocked isocyanate supplied by BAXENDEN CHEMICALS LTD.

Gosheran™ L0301 is a poly(vinyl alcohol-co-vinyl acetate-co-2-propene-1-sulfonic acid sodium salt) supplied by NIPPON GOSHEI Co. LTD.

Marlon™ A365 is an anionic surfactant supplied by SASOL PERFORMANCE CHEMICALS.

Bayh is Bayhydur™ BL XP 2706, a 42 w % aqueous solution of an aliphatic DMP blocked isocyanate containing 3.6 w % NCO supplied by BAYER.

Emulsogen™ TS200 is a polyethylene oxide based dispersing agent supplied by CLARIANT.

Disperbyk™ 190 is a polymeric dispersing agent supplied by BYK CHEMIE GMBH.

Solsperse™ 43000 is a polymeric dispersing agent supplied by Lubrizol.

Diamond™ D75C is a commercial cyan dispersion supplied by DIAMOND DISPERSIONSs LTD.

Alkanol™ XC is surfactant, supplied by DUPONT.

Tegotwin™ 4000 is a siloxane based gemini surfactant from EVONIK.

PB15:3 is an abbreviation used for Hostaperm™ B4G-KR, a C.I. Pigment Blue 15:3 pigment from CLARIANT.

PR254 is the abbreviation for C.I. Pigment Red 254 for which Irgazin™ DPP Red BTR from Ciba Specialty Chemicals was used.

PR122 is the abbreviation for C.I. Pigment Red 122 for which inkjet Magenta™ E 02 from CLARIANT was used.

PY151 is an abbreviation used for INK JET H4G LV 3853, a C.I. Pigment Yellow 151 from CLARIANT.

PBL7 is an abbreviation used for Printex™ 90, a carbon black pigment from EVONIK.

Edaplan is an abbreviation used for Edaplan™ 482, a polymeric dispersant from MUNZING.

Proxel is an abbreviation used for the biocide Proxel™ Ultra 5 from AVECIA.

PEG 200 is a polyethylene glycol having an average molecular mass of 200 from CLARIANT.

PEG 600 is a polyethylene glycol having an average molecular weight between 570 and 630 g/mol from CALDIC BELGIUM nv.

TEA is triethanol amine.

PES is a polyester display substrate Be.Tex™ display 210 FR from BERGER.

Example 1

This example illustrates the pigment fixation on textile by using an aqueous cyan pigmented inkjet ink in combination with a colourless inkjet printing liquid according to the present invention.

Preparation of Cyan Pigment Dispersion DISP-1

An ECM Poly mill, filled for 42% with 0.4 mm yttrium stabilized zirconia beads ("high wear resistant zirconia grinding media" from TOSOH Co.), was preloaded with a solution of 0.124 kg Edaplan in 5.176 kg water. A solution of 11.572 kg Edaplan and 0.267 kg Proxel™ K in 22.861 kg water was prepared in a 60 l vessel and circulated for 5 minutes over the preloaded mill. 10 kg Hostaperm™ B5G-KR was added to the 60 l vessel, while stirring with a Disperlux™ dispenser. The mixture was stirred for 30 minutes. The vessel was reconnected to the mill and the mixture was milled for 7 hours and 45 minutes at a flow rate of 8 litre per minute and a rotation speed of 14.7 m/s. The dispersion was pumped into a 120 litre WIVA vessel. Water was added to the dispersion to end up at a 15 w % dispersion of Hostaperm™ B4G-KR in water.

Preparation of Composite-1

A solution of 285.7 g Trixene™ BI7952 in 450 g ethyl acetate was added to a solution of 100 g Gohseran™ L0301 and 14.8 g Marlon™ A365 in 587 g water while stirring with an Ultra-Turrax™ at 20,000 rpm for 5 min. The dispersion was posttreated with a Microfluidizer™ at 300 bar. Ethyl acetate was removed under reduced pressure at 40° C., while gradually decreasing the pressure until no ethyl acetate was distilled anymore. The average particle size was measured. Composite-1 had an average particle size of 111 nm.

Preparation of Cyan Inkjet Ink C-1

The cyan inkjet ink C-1 was prepared by mixing the components given in Table 6. All weight percentages are based on the total weight of the inkjet ink.

TABLE 6

| Wt % of component: | Ink C-1 |
| --- | --- |
| DISP-1 | 23.8 |
| Glycerol | 19.8 |
| Alkanol ™ XC | 1.0 |
| water | 55.4 |

The cyan inkjet C-1 had a viscosity of 9.5 mPa·s and a surface tension of 30 mN/m.

Preparation of Inkjet Printing Liquid LIQ-1

The inkjet printing liquid LIQ-1 was prepared by mixing the components given in Table 7. All percentages are weight percentages of the total inkjet printing liquid composition.

TABLE 7

| Wt % of component: | LIQ-1 |
| --- | --- |
| Composite-1 | 23.8 |
| Glycerol | 19.8 |
| Alkanol ™ XC | 1.0 |
| Water | 55.4 |

The inkjet printing liquid LIQ-1 had a viscosity of 9.5 mPa·s and a surface tension of 30 mN/m.

Evaluation and Results

The ink set composed of the cyan ink C-1 and the inkjet printing liquid LIQ-1 was used for inkjet printing. A solid area of cyan ink C-1 was printed on a mixed fibre textile, composed of 60% cotton and 40% polyester, using a Dimatix™ DMP2831 system, equipped with a standard Dimatix™ 10 pl print head. The ink was jetted at 22° C., using a firing frequency of 15 kHz, a firing voltage of 25 V and a standard waveform. A solid area of inkjet printing liquid-1 was printed over the solid area of cyan ink C-1, using the same printing conditions. Both inks had excellent jettability.

The solid area was dried and the sample was cut in three parts and one part of the sample was treated in an oven at 160° C. for 5 minutes. One of the untreated samples and the thermally treated sample were washed in an aqueous solution containing 10% of a detergent mix supplied by Bielen N.V. (REF: BEL00985) at 90° C. for 10 minutes.

The three samples were compared visually. There was no visual difference between the reference sample and the thermally treated sample. The colour of the untreated sample was almost completely removed upon washing, illustrating the high efficiency of the approach using a fixing liquid for pigment fixation on textiles.

Example 2

This example illustrates the excellent shelf life and thermal fixation of coloured inkjet printing liquids according to the present invention.

Preparation of Composite-2

A solution of 14.29 g Trixene™ BI7952 in 40 g ethyl acetate was added to a solution of 25 g Disperbyk™ 190 in 65 g water while stirring with an Ultra-Turrax™ at 20000 rpm for 5 min. Ethyl acetate was removed under reduced pressure at 40° C., while gradually decreasing the pressure until no ethyl acetate was distilled anymore. The average particle size was measured. Composite-2 had an average particle size of 210 nm.

Preparation of Composite-3

A solution of 14.29 g Trixene™ BI7952 in 40 g ethyl acetate was added to a solution of 20 g Solsperse™ 43000 in 70 g water while stirring with an Ultra-Turrax™ at 20000 rpm for 5 min. Ethyl acetate was removed under reduced pressure at 40° C., while gradually decreasing the pressure until no ethyl acetate was distilled anymore. The average particle size was measured. Composite-3 had an average particle size of 172 nm.

Preparation of Cyan Inkjet Inks C-2 and C-3

The cyan inks C-2 and C-3 were prepared by mixing the components according to Table 8. All weight percentages are based on the total weight of the inkjet ink.

TABLE 8

| Wt % of Component | C-2 | C-3 |
|---|---|---|
| Diamond ™ D75C | 43.8 | 43.8 |
| Composite-2 | 32.0 | — |
| Composite 3 | — | 32.0 |
| Glycerol | 23.4 | 23.4 |
| Alkanol ™ XC | 0.8 | 0.8 |

Evaluation and Results

A shelf life test was performed by storing the cyan inkjet inks C-2 and C-3 at 60° C. for one week. Changes in viscosity and sedimentation were monitored. After one week none of the inkjet inks had changed in viscosity. The sedimentation was evaluated visually. In none of the inks, any form of sedimentation could be observed.

The thermal fixation was evaluated by impregnating two samples of a mixed fibre textile (60% cotton/40% polyester) with the cyan inkjet inks C-2 and C-3 and dried. One sample, treated with each ink, was treated in an oven at 160° C. for 5 minutes. Both samples were washed in an aqueous solution containing 10% of a detergent mix supplied by Bielen N.V. (REF: BEL00985) at 90° C. for 10 minutes. After washing and drying the thermally treated and untreated samples were evaluated visually. For all the untreated samples, the pigment was almost completely removed, while no pigment was removed from the heat treated samples.

Example 3

This example illustrates the advantage of using thermally reactive composite resin particles on the formulation latitude of the inkjet printing liquids compared to using alternative water soluble components present in the composite resin particles.

Preparation of Composite-4

A solution of 1071 g Trixene™ BI7952 in 1500 g ethyl acetate was added to a solution of 750 g Gohseran™ L0301 in 3200 g water while stirring with an HOMOREX at 10,000 rpm for 5 min. The dispersion was post-treated with a Microfluidizer™ at 300 bar. Ethyl acetate was removed under reduced pressure at 40° C., while gradually decreasing the pressure until no ethyl acetate was distilled anymore. The average particle size was measured. Composite-4 had an average particle size of 90 nm.

Preparation of Inkjet Printing Liquids

The comparative ink jet printing liquids COMP-1 to COMP-5 were formulated by mixing the components according to Table 9.

TABLE 9

| | wt % of component | | | | |
|---|---|---|---|---|---|
| | COMP-1 | COMP-2 | COMP-3 | COMP-4 | COMP-5 |
| Bayh | 19.0 | 23.6 | 28.0 | 36.4 | 44.6 |
| Gosheran ™ L0301 | 4.8 | 5.7 | 6.5 | 9.1 | 10.7 |
| Glycerol | 19.0 | 18.9 | 18.7 | 18.2 | 17.9 |
| Water | 56.3 | 50.9 | 45.9 | 35.4 | 25.9 |
| Alkanol ™ XC | 0.9 | 0.9 | 0.9 | 0.9 | 0.9 |
| Mol % NCO/100 g ink | 16.0 | 20.0 | 24.0 | 31.0 | 38.0 |

The inventive ink jet printing liquids INV-1 to INV-5 were formulated by mixing the components according to Table 10

TABLE 10

| wt % of component | INV-1 | INV-2 | INV-3 | INV-4 | INV-5 |
|---|---|---|---|---|---|
| Composite -4 | 33.1 | 41.3 | 49.6 | 66.1 | 82.7 |
| Glycerol | 16.5 | 16.5 | 16.5 | 16.5 | 16.5 |
| Water | 49.6 | 41.4 | 33.1 | 16.6 | — |
| Alkanol ™ XC | 0.8 | 0.8 | 0.8 | 0.8 | 0.8 |
| Mol % NCO/100 g ink | 18.7 | 23.5 | 28.2 | 37.5 | 47.0 |

Figure 3:
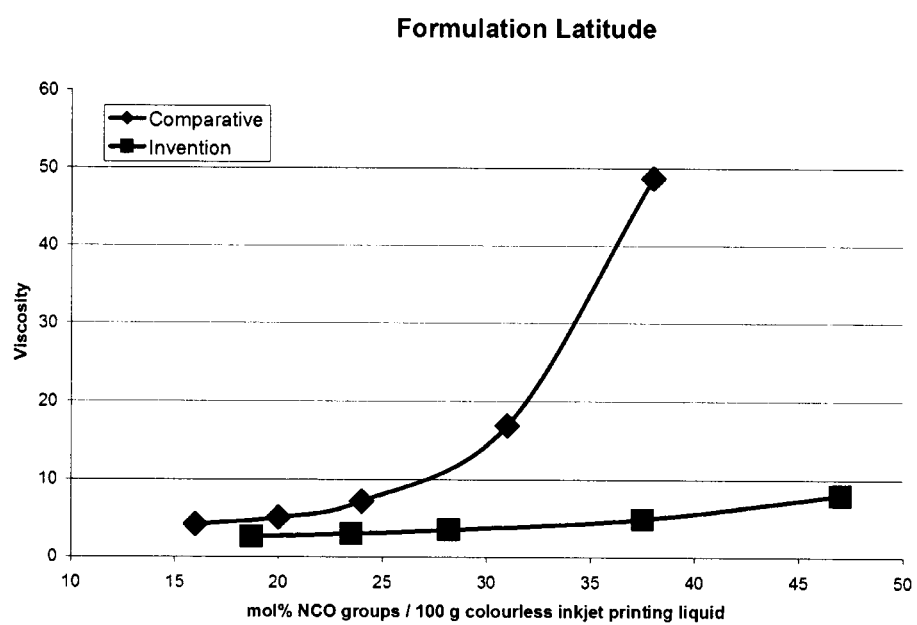
FIG. 3 is a graph visualizing the viscosity results of comparative and inventive inkjet printing liquids in Example 3.

The viscosity of all ink jet printing liquids was measured and the results are shown in Table 11. The results are also visualized in FIG. 3.

TABLE 11

| Formulation | Viscosity (mPa · s) |
|---|---|
| COMP-1 | 4.2 |
| COMP-2 | 5.1 |
| COMP-3 | 7.2 |
| COMP-4 | 16.9 |
| COMP-5 | 48.7 |
| INV-1 | 2.6 |
| INV-2 | 3.0 |
| INV-3 | 3.5 |
| INV-4 | 4.9 |
| INV-5 | 8.0 |

From Table 11, it becomes apparent that only inkjet printing liquids containing composite resin particle allow high concentrations of blocked isocyanates and resins, which is needed for a high throughput industrial printing environment. High concentrations of isocyanates and resins as used in the comparative inkjet printing liquids would necessitate using a diluted inkjet printing liquid, Such a dilution lengthens the drying time and worsens latency and image quality by bleeding.

Example 4

This example illustrates the production of a multicolour image using colour pigmented inkjet inks and thermal fixation properties of a CMYK ink set according to the present invention.

Preparation of Inkjet Printing Liquid LIQ-2

The thermally reactive composite resin particles Composite-1 as prepared in Example 1 were used to prepared the inkjet printing liquid LIQ-2 according to Table 12.

TABLE 12

| wt % of component | LIQ-2 |
|---|---|
| Composite-1 | 78.50 |
| Tegotwin ™ 4000 | 1.50 |
| 2-pyrrolidone | 20.00 |

Preparation of Aqueous Inkjet Ink Set

An aqueous CRYK inkjet ink set was prepared by mixing the components according to Table 14 expressed in weight % based on the total weight of the ink. Each of the inkjet inks was prepared in the same manner by diluting the concentrated pigment dispersion with the other ink components.

The concentrated aqueous pigment dispersions were made in the same manner for each colour pigment by mixing a composition according to Table 13 for 30 minutes using a Disperlux™ Yellow mixer.

TABLE 13

| Component | Concentration (wt %) |
| --- | --- |
| Pigment | 15.00 |
| Edaplan | 15.00 |
| Proxel | 0.02 |
| Water | to complete 100.00 wt % |

Each concentrated aqueous pigment dispersion was then milled using a Dynomill™ KDL with 0.4 mm yttrium stabilized zirconium beads YTZ™ Grinding Media (available from TOSOH Corp.). The mill was filled to half its volume with the grinding beads and the dispersion was milled for 3 hours at flow rate of 200 mL/min and a rotation speed of 15 m/s. After milling, the dispersion is separated from the beads. The concentrated aqueous pigment dispersion served as the basis for the preparation of the inkjet ink.

For preparing the aqueous inkjet ink set, the component TEA was used to obtain a pH between 8.5 and 8.2. Water was added to complete the ink to the desired pigment concentration.

TABLE 14

| Component (in wt %) | C | R | Y | K |
| --- | --- | --- | --- | --- |
| PB15: 3 | 2.20 | — | — | — |
| PR254 | — | 2.70 | — | — |
| PR122 | — | — | — | — |
| PY151 | — | — | 3.85 | — |
| PBL7 | — | — | — | 2.70 |
| Edaplan | 2.20 | 2.70 | 3.85 | 2.70 |
| 1,2-Hexanediol | 3.00 | 3.00 | 2.50 | 3.00 |
| Glycerine | 20.00 | 20.00 | 20.00 | 20.00 |
| PEG 200 | 20.00 | 18.00 | 13.00 | — |
| PEG 600 | — | — | — | 11.90 |
| Proxel | 0.01 | 0.01 | 0.01 | 0.01 |
| TEA | 0.60 | 0.50 | 0.70 | 0.50 |
| Water | to complete 100.00 wt % | | | |

Evaluation and Results

For inkjet printing, a Jeti™ Titan S true flatbed six-color UV inkjet printer from Agfa Graphics was used wherein the UV lamps were replaced by a NIR dryer from Adphos. The decorative images were printed using the Ricoh™ Gen 5 print heads at a head temperature of 32° C. at 600 dpi. The printed samples received a further heat treatment in an oven for 10 minutes at 150° C. after the exposure to the NIR dryer.

Samples were printed on a polyester display substrate PES with and without the inkjet printing liquid LIQ-2 and tested for wash fastness and dry rubbing. The results are shown in Table 15.

TABLE 15

| Sample | Wash Fastness | Dry Rubbing |
| --- | --- | --- |
| Without LIQ-2 | Poor | Excessive color transfer, poor color fastness |
| With LIQ-2 | Excellent | No color transfer, excellent color fastness |

From Table 15, it should be clear that wash fast and color fast inkjet printed textiles can be produced when the inkjet printing liquid LIQ-2 is used in the combination with the aqueous CRYK inkjet ink set.

REFERENCE SIGNS LIST

TABLE 16

| 1 | Inkjet printing liquid |
| --- | --- |
| 2 | Thermally reactive composite resin particle |
| 3 | Hydrophilic polymeric segment of amphiphilic polymer |
| 4 | Hydrophobic polymeric segment of amphiphilic polymer |
| 5 | Thermal cross-linker |
| 6 | Colorant |
| 7 | Aqueous medium |

The invention claimed is:

1. An inkjet printing liquid comprising:
thermally reactive composite resin particles in an aqueous medium;
wherein the thermally composite resin particles include:
at least one thermal cross-linker including at least one functional group selected from the group consisting of an epoxide, an oxetane, an aziridine, an azetidine, and a blocked isocyanate;
at least one polymeric resin including functional groups that react with the at least one thermal cross-linker;
the at least one polymeric resin is an amphiphilic polymer including:
a hydrophobic segment that is based on styrene based, acrylate based, vinyl ester based, vinyl acetal based, or combinations thereof; and a hydrophilic polymeric segment that includes at least one functional group selected from the group consisting of a sulfonic acid or salt thereof, a carboxylic acid or salt thereof, a —$(CH_2CH_2O)_n$—H group wherein n represents an integer from 2 to 25, and a C2 to C12 aliphatic group substituted by hydroxyl groups wherein a carbon to hydroxyl ratio is 2 or less.

2. The inkjet printing liquid according to claim 1, further comprising at least another polymeric resin including functional groups selected from the group consisting of a hydroxyl group, a primary amine group, a secondary amine group, an amide group, a urethane group, an urea group, a carboxylic acid group or salt thereof, and an epoxide group.

3. The inkjet printing liquid according to claim 1, further comprising a catalyst selected from the group consisting of a Brönsted acid, a Lewis acid, and a thermal acid generator.

4. The inkjet printing liquid according to claim 2, further comprising a catalyst selected from the group consisting of a Brönsted acid, a Lewis acid, and a thermal acid generator.

5. The inkjet printing liquid according to claim 1, further comprising a colorant.

6. The inkjet printing liquid according to claim 5, wherein the colorant includes a self-dispersible color pigment in the aqueous medium.

7. An inkjet printing ink set comprising:
the inkjet printing liquid according to claim 1; and
one or more aqueous color pigmented inkjet inks.

* * * * *